(No Model.)
W. J. MALTBY & A. BELCHER.
DEVICE FOR CLEANING CISTERNS, &c.
No. 477,908. Patented June 28, 1892.
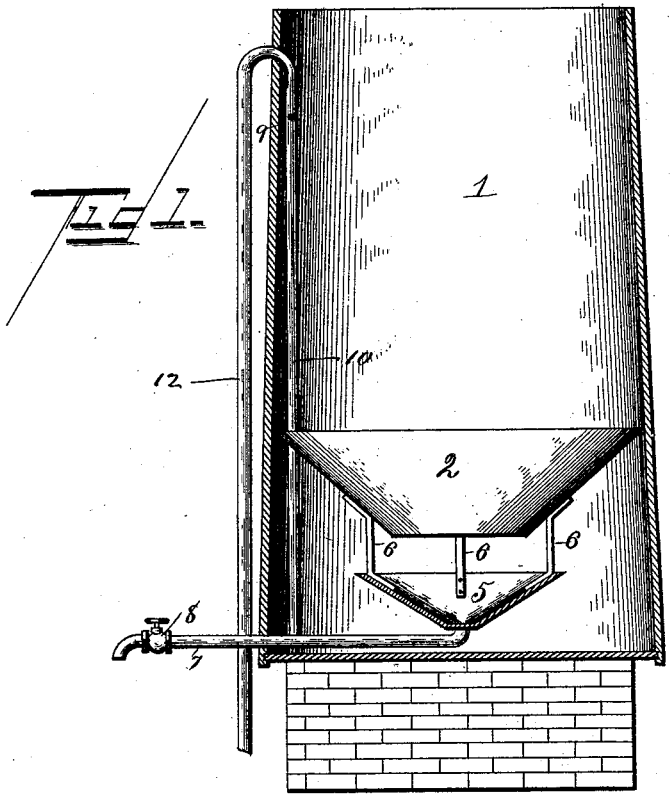
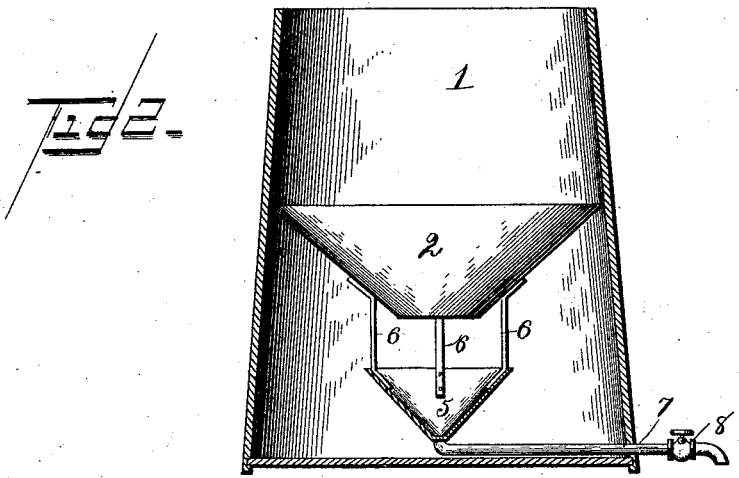
WITNESSES:
F. L. Ourand
W. L. Coombs
INVENTORS
Wm. J. Maltby and
Alexander Belcher
by James Dagger & Co
Attorneys
THE NORRIS PETERS CO., PHOTO-LITHO., WASHINGTON, D. C.

UNITED STATES PATENT OFFICE.

WILLIAM JAMES MALTBY AND ALEXANDER BELCHER, OF NEW ORLEANS, LOUISIANA.

DEVICE FOR CLEANING CISTERNS, &c.

SPECIFICATION forming part of Letters Patent No. 477,908, dated June 28, 1892.

Application filed November 24, 1891. Serial No. 412,993. (No model.)

*To all whom it may concern:*

Be it known that we, WILLIAM JAMES MALTBY and ALEXANDER BELCHER, citizens of the United States, and residents of New Orleans, in the county of Orleans and State of Louisiana, have invented certain new and useful Improvements in Devices for Cleaning Cisterns, &c.; and we do hereby declare that the following is a full, clear, and exact description of the invention, which will enable others skilled in the art to which it appertains to make and use the same, reference being had to the accompanying drawings, which form a part of this specification.

Our invention relates to improvements in means for removing sediment from cisterns, water-tanks, and other similar receptacles.

In certain portions of the country, as is well known, the sole supply of water for drinking and cooking purposes is that furnished by rain, which is led from the roofs of houses and other buildings to reservoirs or cisterns and stored for future use. This water contains much foreign matter and impurities, which are carried with it to the cistern, where it is precipitated and accumulates in the form of sediment, which has to be frequently removed in order to render the water fit for household purposes.

The object of our invention is to provide improved means whereby the sediment is collected and removed from the cistern without drawing off or agitating the water therein.

The invention consists in the novel construction and combination of parts hereinafter fully described and claimed.

In the accompanying drawings, Figure 1 is a sectional view of a cistern constructed according to our invention. Fig. 2 is a similar view showing a modification of the same.

In the said drawings, the reference-numeral 1 designates a cistern or reservoir of any ordinary construction. In the lower part of this cistern is located a conical vessel 2, having an open bottom. This vessel discharges into a similar but smaller vessel 5, connected with the vessel 2 by means of arms 6. At its bottom vessel 5 is provided with a pipe 7, having cock 8, by which the sediment which collects in said vessel may be drawn off.

Located within the cistern and connected and communicating with the pipe 7 is the short leg 10 of a siphon. This leg extends up to near the top of the cistern, where it is bent and extended downwardly outside of and below the bottom of the cistern, forming a long leg 12. Near its upper end the leg 10 is provided with a hole or aperture 9.

The operation will be readily understood. When the water in the cistern rises above the bend in the siphon, the water and sediment will be carried from the vessel or basin 5 out through the siphon, the flow being continuous until the level below the hole 9 is reached, when air will enter through said hole and the flow will cease.

When the water-level is not sufficient to operate the siphon, the sediment may be drawn off by means of the cock.

Having thus described our invention, what we claim is—

The combination, with a reservoir or cistern, of the conical vessels 2 and 5, the pipe 7, connected with the lower vessel and provided with a stop-cock, and the siphon connected with said pipe, provided with a hole or aperture, substantially as and for the purpose specified.

In testimony that we claim the foregoing as our own we have hereunto affixed our signatures in presence of two witnesses.

WILLIAM JAMES MALTBY.
ALEXANDER BELCHER.

Witnesses:
WILLIAM W. SUTCLIFFE,
JNO. M. COOS.